(12) United States Patent
Kwon

(10) Patent No.: US 11,529,927 B2
(45) Date of Patent: Dec. 20, 2022

(54) AIRBAG APPARATUS FOR VEHICLE

(71) Applicants: HYUNDAI MOTOR COMPANY, Seoul (KR); KIA CORPORATION, Seoul (KR)

(72) Inventor: Hyock In Kwon, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/227,803

(22) Filed: Apr. 12, 2021

(65) Prior Publication Data

US 2021/0229623 A1 Jul. 29, 2021

Related U.S. Application Data

(63) Continuation-in-part of application No. 16/387,909, filed on Apr. 18, 2019, now Pat. No. 11,001,225.

(30) Foreign Application Priority Data

Dec. 11, 2018 (KR) ........................ 10-2018-0158989

(51) Int. Cl.
*B60R 21/36* (2011.01)
*B60R 21/2338* (2011.01)

(52) U.S. Cl.
CPC .... *B60R 21/36* (2013.01); *B60R 2021/23386* (2013.01)

(58) Field of Classification Search
CPC .. B60R 2021/0009; B60R 2021/23107; B60R 2021/23192; B60R 2021/23324; B60R 2021/23382; B60R 2021/23386; B60R 2021/23388; B60R 2021/346; B60R 21/213; B60R 21/214; B60R 21/232; B60R 21/2338; B60R 21/2346; B60R 21/36

See application file for complete search history.

(56) References Cited

U.S. PATENT DOCUMENTS

| | | | |
|---|---|---|---|
| 4,995,659 A | 2/1991 | Park | |
| 5,646,613 A | 7/1997 | Cho | |
| 5,732,785 A | 3/1998 | Ran et al. | |

(Continued)

FOREIGN PATENT DOCUMENTS

| | | | |
|---|---|---|---|
| JP | 2000-108824 A | 4/2000 | |
| JP | 2003-291756 A | 10/2003 | |

(Continued)

*Primary Examiner* — Laura Freedman
(74) *Attorney, Agent, or Firm* — Lempia Summerfield Katz LLC

(57) ABSTRACT

An airbag apparatus for a vehicle is capable of protecting a collision object while protecting the vehicle and an occupant. In particular, the airbag apparatus is installed in a fully autonomous vehicle in which the occupant's position and posture are variable. The airbag apparatus includes an inflator provided at a pillar of a vehicle body and configured to generate working gas, a housing mounted to the pillar of the vehicle body, a cushion part accommodated in the housing and configured to be inflated as being discharged from the housing by receiving the working gas generated from the inflator for covering the vehicle, and a tether part provided in the cushion part to determine a deployment shape of the cushion part.

13 Claims, 9 Drawing Sheets

(56) References Cited

U.S. PATENT DOCUMENTS

| | | | |
|---|---|---|---|
| 5,845,935 A * | 12/1998 | Enders | B60R 21/2338 280/730.2 |
| 5,992,794 A | 11/1999 | Rotman et al. | |
| 6,113,132 A * | 9/2000 | Saslecov | B60R 21/20 280/730.1 |
| 6,129,377 A * | 10/2000 | Okumura | B60R 21/213 280/730.2 |
| 6,142,508 A * | 11/2000 | Lewis | B60R 21/2171 280/730.2 |
| 6,227,325 B1 | 5/2001 | Shah | |
| 6,234,517 B1 * | 5/2001 | Miyahara | B60R 21/04 280/751 |
| 6,237,939 B1 * | 5/2001 | Resh | B60R 21/232 280/730.2 |
| 6,416,093 B1 | 7/2002 | Schneider | |
| 6,808,198 B2 * | 10/2004 | Schneider | B60R 21/237 280/743.1 |
| 6,808,205 B2 | 10/2004 | Hawthorn et al. | |
| 6,880,666 B2 | 4/2005 | Kikuchi et al. | |
| 6,883,631 B2 | 4/2005 | Hu et al. | |
| 6,938,918 B2 * | 9/2005 | Viano | B60R 21/213 280/730.1 |
| 6,988,578 B2 | 1/2006 | Kikuchi et al. | |
| 7,048,086 B2 | 5/2006 | Yoneda | |
| 7,172,048 B2 * | 2/2007 | Hamada | B60R 21/2338 180/274 |
| 7,232,001 B2 | 6/2007 | Hakki et al. | |
| 7,237,798 B2 * | 7/2007 | Mori | B60R 21/232 280/743.1 |
| 7,374,205 B2 | 5/2008 | Thomas | |
| 7,461,858 B2 * | 12/2008 | Hirata | B60R 21/232 280/730.2 |
| 7,584,988 B2 | 9/2009 | Okamoto et al. | |
| 7,762,579 B2 * | 7/2010 | Garner | B60R 21/232 280/730.2 |
| 7,806,221 B2 | 10/2010 | Mishra | |
| 7,806,432 B2 * | 10/2010 | Nelson | B60R 21/232 280/730.2 |
| 7,828,106 B1 | 11/2010 | Ratajski et al. | |
| 8,727,061 B2 * | 5/2014 | Rydsmo | B60R 21/36 180/274 |
| 9,027,696 B2 | 5/2015 | Park | |
| 9,132,799 B1 | 9/2015 | Choi | |
| 9,327,669 B2 * | 5/2016 | Jaradi | B60R 21/08 |
| 9,463,769 B2 | 10/2016 | Park et al. | |
| 9,815,427 B2 | 11/2017 | Barbat et al. | |
| 10,300,880 B2 | 5/2019 | Mihm | |
| 11,001,225 B2 * | 5/2021 | Kwon | B60R 21/2338 |
| 2004/0049331 A1 | 3/2004 | Schneider | |
| 2006/0097491 A1 * | 5/2006 | Saberan | B60R 21/232 280/730.2 |
| 2007/0023223 A1 | 2/2007 | Okamoto et al. | |
| 2007/0170709 A1 | 7/2007 | Braun et al. | |
| 2018/0022310 A1 | 1/2018 | Olson | |
| 2021/0394702 A1 * | 12/2021 | Farooq | B60R 21/214 |

FOREIGN PATENT DOCUMENTS

| | | | | |
|---|---|---|---|---|
| JP | 2006-219046 A | | 8/2006 | |
| JP | 2008285110 A | * | 11/2008 | B60R 21/36 |
| JP | 2009096278 A | * | 5/2009 | B60R 21/36 |
| JP | 2015-134564 A | | 7/2015 | |

* cited by examiner

AIRBAG APPARATUS FOR VEHICLE

CROSS REFERENCE TO RELATED APPLICATION

This application is a continuation-in-part of non-provisional U.S. patent application Ser. No. 16/387,909, filed on Apr. 18, 2019 which claims priority to and the benefit of Korean Patent Application No. 10-2018-0158989, filed on Dec. 11, 2018, which are incorporated herein by reference in its entirety.

FIELD

The present disclosure relates generally to an airbag apparatus for a vehicle.

BACKGROUND

The statements in this section merely provide background information related to the present disclosure and may not constitute prior art.

Various types of airbags are installed in conventional vehicles to protect occupants in a crash. In the conventional vehicle, a seat on which an occupant sits is provided at a predetermined position, thereby determining the position and posture of the occupant. Therefore, most of the occupants in the conventional vehicles take a similar position and posture, and accordingly, the position and shape of the airbags are generally installed on the front and side of the vehicle interior.

In recent years, however, research has been continuously conducted on autonomous vehicles in accordance with technological developments, and the autonomous vehicles that do not require the occupant to operate the vehicle have been studied.

Since the autonomous vehicle does not require the driver to operate the vehicle, the seat arrangement and the interior structure of the vehicle are no longer desired to be arranged in a conventional manner such as a driver's seat, a front passenger's seat and a rear seat.

Therefore, the autonomous vehicle desires a new concept of the airbag apparatus to protect an occupant who is sitting in an arbitrary position and posture in the vehicle during a collision.

The above information disclosed in this Background section is only for enhancement of understanding of the background of the present disclosure, and therefore it may contain information that does not form the prior art that is already know to a person of ordinary skill in the art.

SUMMARY

The present disclosure provides an airbag apparatus for a vehicle, the airbag apparatus capable of protecting a collision object while protecting a vehicle and an occupant by being installed in a fully autonomous vehicle in which the occupant's position and posture are variable.

According to an aspect of the present disclosure, there is provided an airbag apparatus for a vehicle. the airbag apparatus includes an inflator provided at a pillar of a vehicle body and configured to generate working gas, a housing mounted to the pillar of the vehicle body, a cushion part accommodated in the housing and configured to be inflated and discharged from the housing by receiving the working gas generated from the inflator, and structured to cover the vehicle, and a tether part provided in the cushion part to determine a deployment shape of the cushion part.

According to a further aspect of the present disclosure, the pillar may include an upper portion and a lower portion, and the inflator and the housing may be separately mounted to the upper portion and the lower portion, respectively.

The inflator may be mounted to the upper portion of the pillar, and the housing may be mounted to the lower portion of the pillar.

The lower portion of the pillar may extend in a vertical direction, and the housing may be formed to extend in the vertical direction along the lower portion of the pillar.

The pillar may further include a curved portion between the upper portion and the lower portion, and the cushion part may be folded along a shape of the curved portion of the pillar and may be connected to the inflator.

The housing may include an opening configured to discharge the cushion part, and the opening may be oriented to a center in a width direction of the vehicle body.

The pillar may be an A-pillar, and the cushion part may be configured to deploy and expand to cover a front of the vehicle.

According to a further aspect of the present disclosure, the cushion part may be provided therein with a deployment guide means for guiding the deployment shape of the cushion part by guiding a flow of the working gas provided from the inflator.

The deployment guide means may include a diffuser communicating with the inflator to branch and supply the working gas into the cushion part, and a first diaphragm and a second diaphragm dividing an internal space of the cushion part into multiple chambers. The first diaphragm and the second diaphragm are provided with multiple flow holes to communicate adjacent chambers with each other.

According to a further aspect of the present disclosure, the diffuser may branch the working gas in a vertical direction. The internal space of the cushion part may be divided into the multiple chambers in the vertical direction by the first diaphragm and the second diaphragm, and the multiple chambers may be configured such that volumes of internal spaces thereof are gradually decreased from lower to upper directions, and the working gas branching and being supplied from the diffuser may be supplied in such a manner that a lowermost chamber of the multiple chambers is supplied with the working gas more than remaining chambers.

According to a further aspect of the present disclosure, the tether part may include a first tether and a second tether configured such that first ends thereof are fixed to the housing and second ends thereof are fixed to an end portion of the cushion part, and a length of the first tether may be configured to be shorter than a length of the second tether.

The first tether and the second tether may be fixed to the end portion of a first surface of the cushion part, and the first surface of the cushion part may be configured to face a glass provided in the vehicle body.

The airbag apparatus may further include a tether cutter for selectively cutting the first tether. Accordingly, the cushion part is interrupted by the first tether or the second tether depending on operation of the tether cutter, which is selectively determined by a type of collision, and the deployment shape of the cushion part is determined.

According to a further aspect of the present disclosure, each of the inflator, the housing, the cushion part, and the tether part may be configured as at least one pair that is arranged symmetrically with each other on opposite sides of a front edge or a rear edge of the vehicle body.

The vehicle body may be a vehicle body of an autonomous vehicle.

According to a further aspect of the present disclosure, there is provided an airbag apparatus for a vehicle. The airbag apparatus includes an inflator mounted to a roof edge of a vehicle body, and configured to generate working gas, a housing mounted to the roof edge of the vehicle body, a cushion part accommodated in the housing, the cushion part configured to be inflated and discharged from the housing by receiving the working gas generated from the inflator, and structured to cover the vehicle, and a tether part provided in the cushion part to determine a deployment shape of the cushion part.

The cushion part may be configured to deploy from top towards bottom at front, back, and opposite sides of the vehicle body.

According to an aspect of the present disclosure, since the airbag apparatus is provided to be deployed outside a mobility platform vehicle, which is a fully autonomous vehicle not requiring a driver's seat, it is possible to absorb impacts transmitted to the vehicle in the event of an external collision, thereby protecting the vehicle and the occupant while protecting the collision object.

Further, the first tether and the second tether having different lengths to determine the deployment shape of the cushion part are provided such that the tether restricting the cushion part is selected depending on the collision type, whereby it is possible to selectively inflate the shape of the cushion part depending on the collision type.

Further, when the airbag apparatus according to an aspect of the present disclosure is applied to a fully autonomous vehicle, in the event of a vehicle-to-vehicle collision, the airbag is deployed in each vehicle to increase shock absorption performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
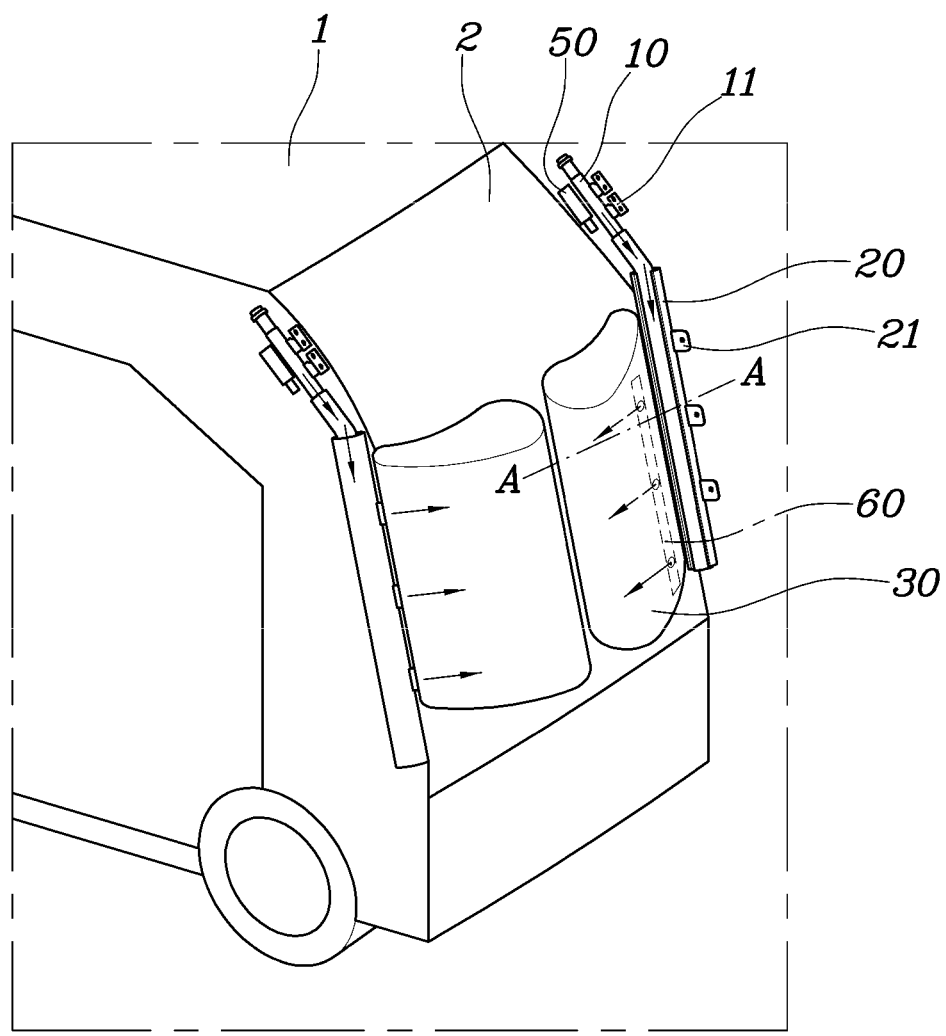
FIG. 1 illustrates an airbag apparatus for a vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 through 4, an airbag apparatus for a vehicle according to a form of the present disclosure includes an inflator 10 provided outside a vehicle body 1 and configured to generate working gas, a housing 20 mounted to an edge of the vehicle body 1, a cushion part 30 accommodated in the housing 20 and configured to be inflated as being discharged from the housing 20 by receiving the working gas generated from the inflator 10 for covering a front of the vehicle body 1, and a tether part 40 provided in the cushion part 30 to determine a deployment shape of the cushion part 30. As shown in FIG. 1, for example, the airbag apparatus is applied to a vehicle body of an autonomous vehicle. However, according to other form of the present disclosure, the airbag apparatus may be applied to a vehicle body of any vehicles.

The inflator 10 is a means for inflating the cushion part 30 by supplying the cushion part 30 with working gas generated when gunpowder or gas filled therein explodes, and an inflator that is applied to a general airbag apparatus is used. However, the inflator 10 is mounted outside the vehicle body 1. For example, as shown in FIG. 1, the inflator 10 may be mounted to a side on a front edge and/or a rear edge of the vehicle body 1 by an inflator mount 11.

The housing 20 is provided on a side of the front edge and/or the rear edge of the vehicle body 1 to be adjacent to the inflator 10, and the stowed cushion part 30 is accommodated in the housing 20.

For example, the inflator 10 and the housing 20 may be mounted to a pillar of the vehicle body 1. That is, the inflator 10 and the housing 20 may be mounted to an A-pillar arranged at a front of the vehicle body 1 or to a C-pillar arranged at a rear of the vehicle body 1. The inflator 10 and the housing 20 may be mounted to both of the A-pillar and the C-pillar.

For example, a pair of the inflator 10 and the housing 20 may be mounted to each of a pair of the A-pillars constituting the vehicle body 1 such that the pair of the inflator 10 and the housing 20 may cover the front of the vehicle body 1. That is, the inflator 10 and the housing 20 may cover the front of the vehicle.

Here, the pillar may include an upper portion and a lower portion, and the inflator 10 and the housing 20 may be separately mounted to the upper portion and the lower portion, respectively.

Figure 2:
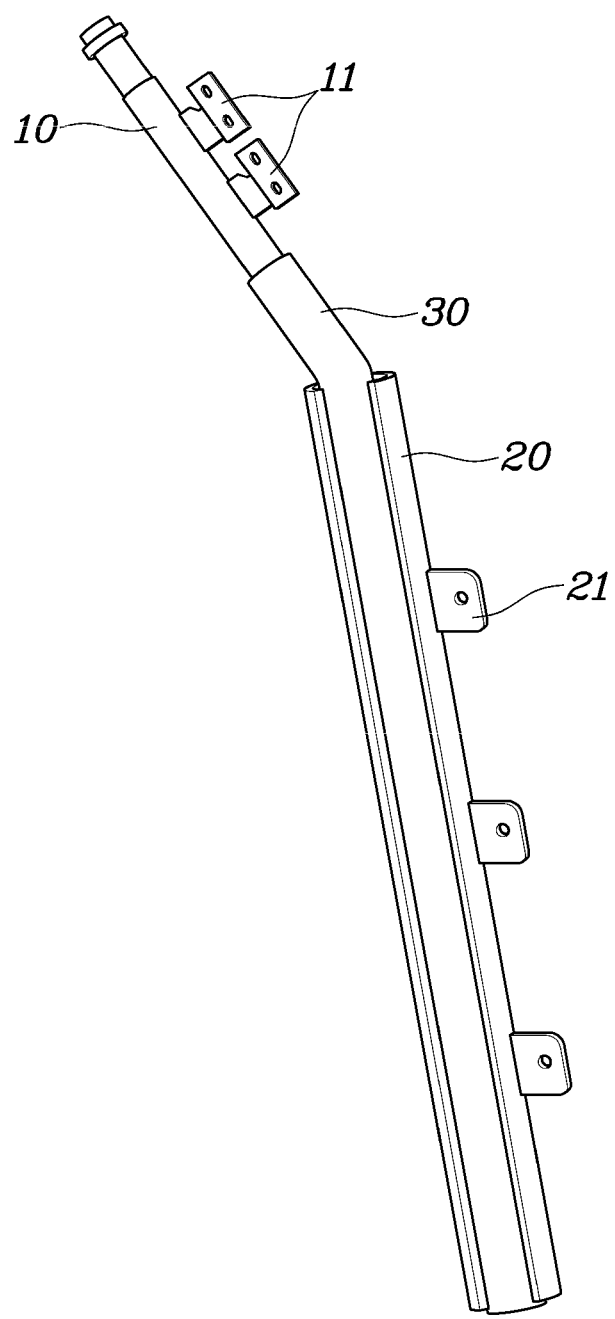
FIG. 2 illustrates a state before the airbag apparatus for a vehicle according to the form of the present disclosure is deployed.

For example, as shown in FIGS. 1 and 2, the inflator 10 may be mounted to the upper portion of the pillar, and the housing 20 may be mounted to the lower portion of the pillar.

In particular, the lower portion of the pillar may extend in a vertical direction. Accordingly, the housing 20 may be formed to extend in the vertical direction along the lower portion of the pillar.

Meanwhile, the housing 20 may be formed with an opening for determining the deployment direction of the cushion part 30. The opening formed in the housing 20 may be varied depending on the deployment direction of the cushion part 30.

For example, the opening may be oriented to a center in a width direction of the vehicle body 1, such that the cushion part 30 may deploy toward the center in the width direction of the vehicle body 1.

In addition, the housing 20 may be provided outside the vehicle body 1 by a housing mount 21. That is, housing 20 may be mounted to the lower portion of the pillar by the housing mount 21.

As the working gas provided from the inflator 10 is injected, the cushion part 30 is discharged from the housing 20 and is inflated, which is substantially a means of protecting the vehicle body and an occupant. The overall shape of the cushion part 30 can be varied and applied depending on the type of object to be protected.

In particular, the cushion part 30 may be accommodated in the housing 20 and may be connected to the inflator 10 such that the cushion part 30 may receive the working gas generated from the inflator 10.

Here, as shown in FIGS. 1 and 2, the pillar may include a curved portion between the upper portion and the lower portion. The cushion part 30 may be folded along a shape of the curved portion of the pillar to be connected to the inflator 10.

As shown in FIG. 1, the cushion part 30 may be provided therein with a deployment guide means 60 for guiding a deployment shape of the cushion part 30 by a flow of the working gas provided from the inflator 10.

Figure 5:
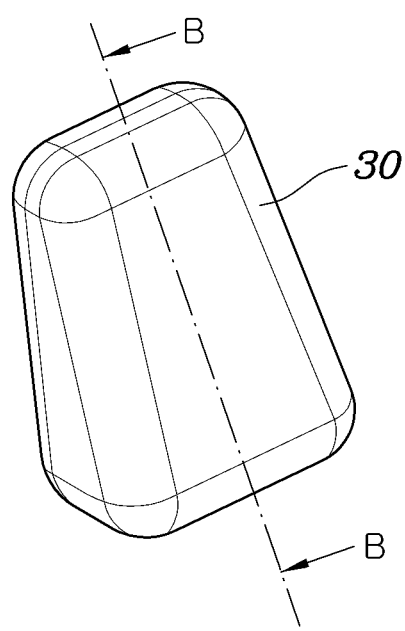
FIG. 5 illustrates a cushion part of the airbag apparatus for a vehicle according to the form of the present disclosure.
Figure 5:
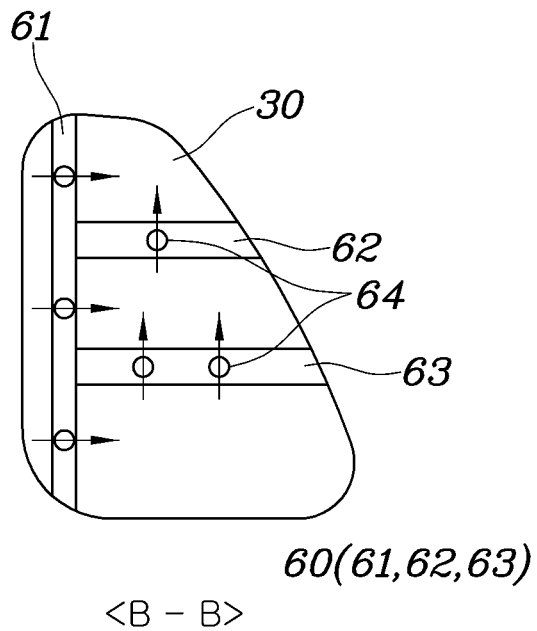

Referring to FIG. 5, the deployment guide means 60 may include a diffuser 61 communicating with the inflator 10 to branch and supply the working gas into the cushion part 30; and a first diaphragm 62 and a second diaphragm 63 dividing an internal space of the cushion part 30 into multiple chambers.

As shown in FIG. 5, the diffuser 61 is formed in the vertical direction inside the cushion part 30 and branches the working gas supplied from the inflator 10 in the vertical direction inside the cushion part 30.

Further, the internal space of the cushion part 30 may be divided into the multiple chambers in the vertical direction by the first diaphragm 62 and the second diaphragm 63, and the multiple chambers may be formed such that volumes of internal spaces thereof are gradually decreased from lower to upper directions. In addition, it is preferable that the first diaphragm 62 and the second diaphragm 63 are provided with multiple flow holes 64 to communicate adjacent chambers with each other.

It is preferable that the working gas branching and being supplied from the diffuser 61 is supplied in such a manner that a lowermost chamber of the multiple chambers is supplied with the working gas more than remaining chambers. Thus, when a collision of the vehicle body 1 occurs, it is preferable that the cushion part 30 absorbs impact while firstly coming into contact with the impact object in the lower region thereof, and the working gas is sequentially transferred to the upper chamber through the first diaphragm 62 and the second diaphragm 63 such that the pressure of the cushion part 30 is maintained.

Meanwhile, the tether part 40 is a means for determining the deployment shape of the cushion part 30. For example, the tether part 40 may include a first tether 41 and a second tether 42 configured such that first ends thereof are fixed to the housing 20 and second ends thereof are fixed to an end portion of the cushion part 30. It is preferable that a length of the first tether 41 is formed to be shorter than a length of the second tether 42, such that the deployment shape of the cushion part 30 is selectively determined by the first tether 41 and the second tether 42. Further, the first tether 41 and the second tether 42 are provided in the direction where the cushion part is brought into close contact with a glass 2 provided in the vehicle body 1 when the cushion part 30 is deployed.

Figure 3:
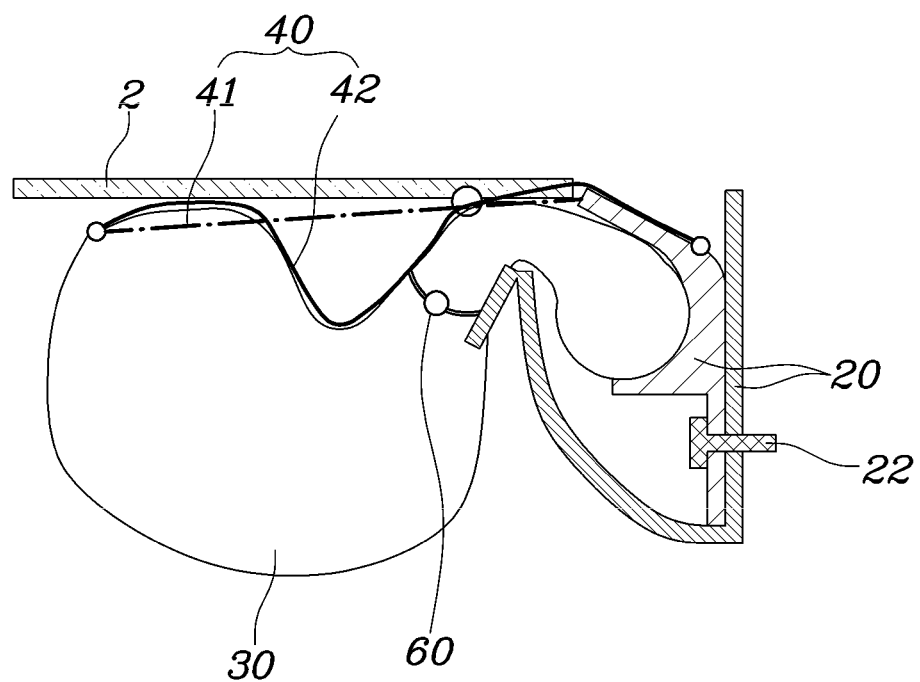
FIGS. 3 and 4 illustrate a state after the airbag apparatus for a vehicle according to the form of the present disclosure is deployed.
Figure 4:
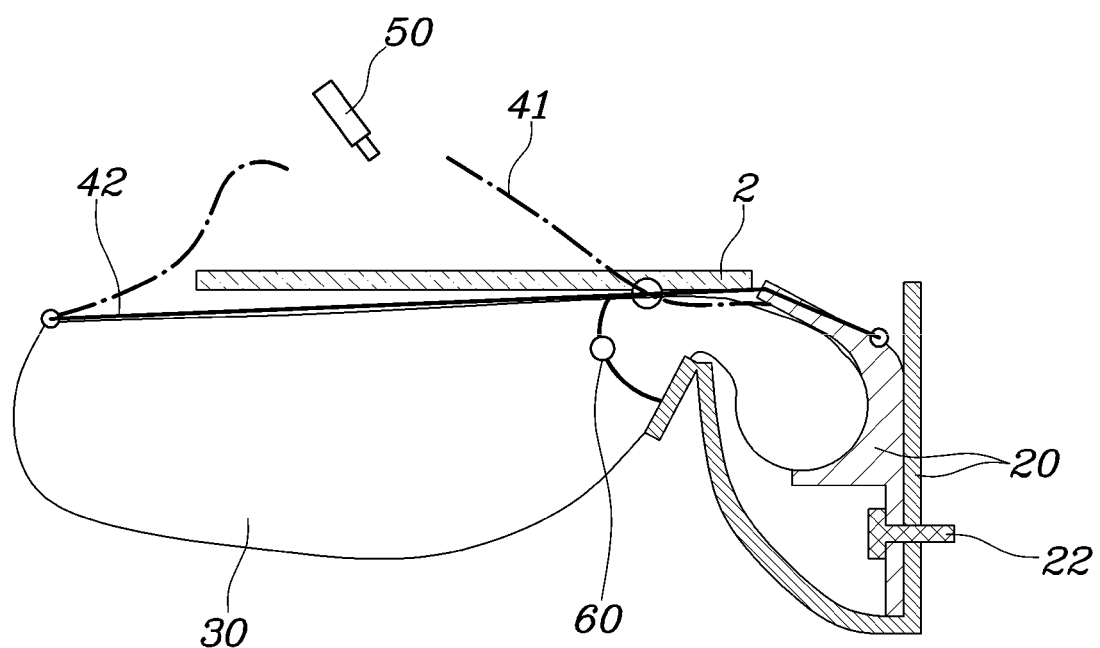

For example, as shown in FIGS. 3 and 4, the second ends of the first tether 41 and the second tether 42 may be fixed to the end portion of a first surface of the cushion part 30. Here, the first surface of the cushion part 30 may be configured to face a glass 2 provided in the vehicle body 1.

Accordingly, when the cushion part 30 is inflated, the cushion part 30 may be inflated while being brought into close contact with the glass 2 by the first tether 41 and the second tether 42.

In order for the first tether 41 and the second tether 42 to selectively determine the deployment shape of the cushion part 30, the airbag apparatus further includes a tether cutter 50 for selectively cutting the first tether 41. Accordingly, the cushion part 30 is interrupted by the first tether 41 or the second tether 42 depending on operation of the tether cutter 50, which is selectively determined by a type of collision, and the deployment shape is determined.

For example, as shown in FIG. 3, in the case where the tether cutter 50 is not operated, the inflator 10 is triggered and the working gas is supplied to the cushion part 30, so the cushion part 30 is inflated. Here, the end portion of the cushion part 30 is interrupted by the shorter first tether 41, such that the cushion part 30 is inflated to have a thick thickness in a narrow range without being fully deployed in the longitudinal direction.

On the contrary, as shown in FIG. 4, in the case where the tether cutter 50 is operated, the tether cutter 50 is operated with the signal that the inflator 10 is triggered, and cuts the first tether 41. Accordingly, the inflator 10 is triggered and the working gas is supplied to the cushion part 30, so the cushion part 30 is inflated. Here, the end portion of the cushion part 30 is interrupted by the longer second tether 42, such that the cushion part 30 is fully deployed in the longitudinal direction, thereby being inflated to have a thin thickness in a wide range.

The determination of the type of collision may be determined by signals detected in various sensors provided in the vehicle. For example, the collision type may be determined in such a manner that signals detected by various sensors such as an ADAS sensor, a brake sensor, a vehicle speed sensor, a yaw rate sensor, a GPS, a SAN angle sensor, and a VDS are analyzed by the ECU and are compared with the established collision type database.

The airbag apparatus for a vehicle according to the form of the present disclosure configured as described above may be installed in a variety of ways at various locations in the vehicle body.

For example, as shown in FIGS. 1 and 3, each of the inflator 10, the housing 20, the cushion part 30, and the tether part 40 may be configured as at least one pair that is arranged symmetrically with each other on opposite sides of a front edge or a rear edge of the vehicle body.

Figure 9:
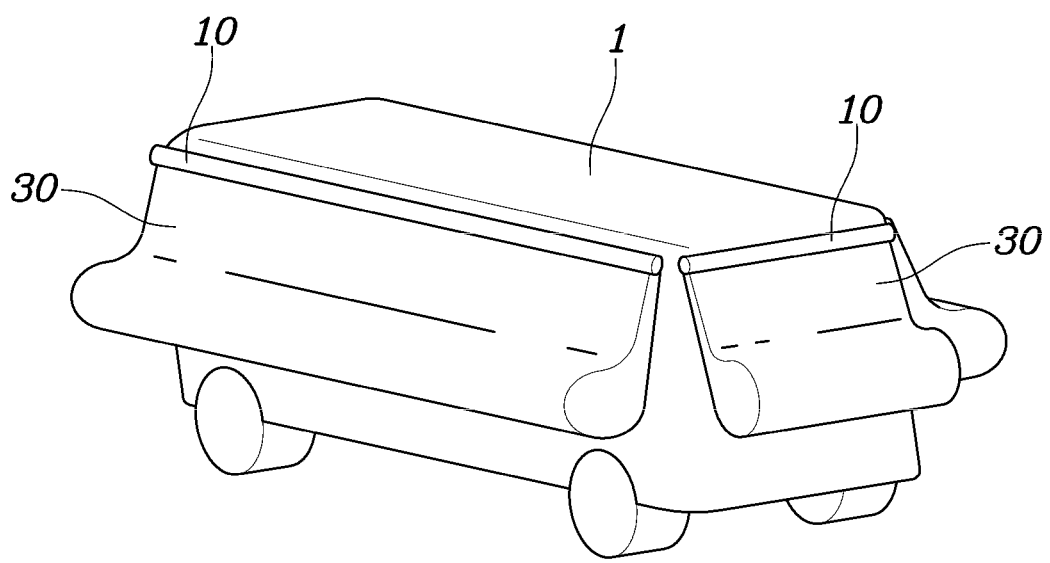
FIG. 9 illustrates a state after the airbag apparatus for a vehicle according to another form of the present disclosure is deployed.

Further, as shown in FIG. 9, each of the inflator 10, the housing 20, the cushion part 30, and the tether part 40 (not shown) may be provided at a roof edge of the vehicle body 1 such that the cushion part 30 is deployed from top towards bottom at the front, a back, and opposite sides of the vehicle body 1.

Hereinafter, reference will be made to examples of deployment shapes of the airbag apparatus for a vehicle according to the form of the present disclosure configured as described above depending on the collision type.

Figure 6:
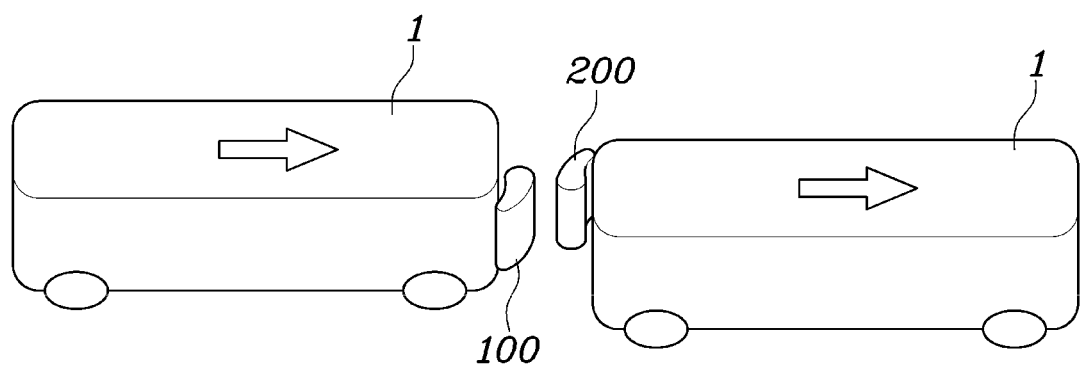
FIGS. 6 to 8 illustrate deployment shapes of the airbag apparatus for a vehicle according to the form of the present disclosure depending on various collision types.
Figure 6:
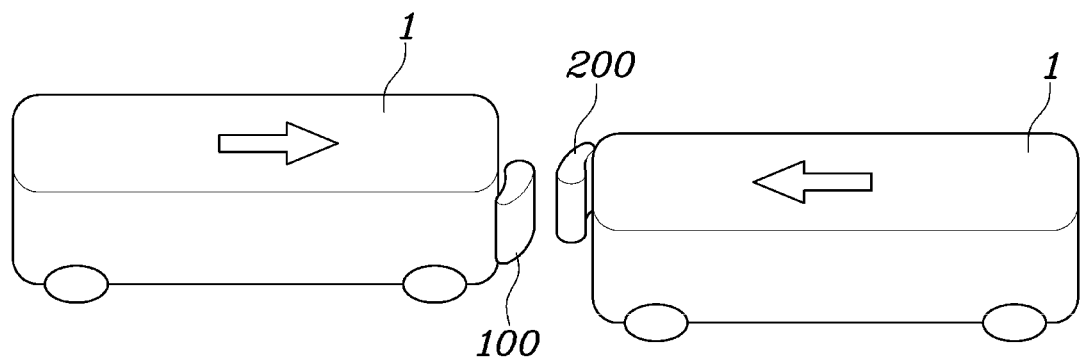

Referring to FIG. 6, the airbag apparatuses 100 and 200 are installed in the vehicle body 1 of the mobility platform vehicle, for example, a fully autonomous vehicle. When a vehicle-to-vehicle offset crash occurs between autonomous vehicles, of the left and right airbag apparatuses 100 and 200, only the airbag apparatus in the crash area can be deployed. For example, when the offset crash occurs between vehicles, of the left and right airbag apparatuses 100 and 200, the airbag apparatuses 100 and 200 provided at the corresponding position can be simultaneously deployed to absorb the shock.

Figure 7:
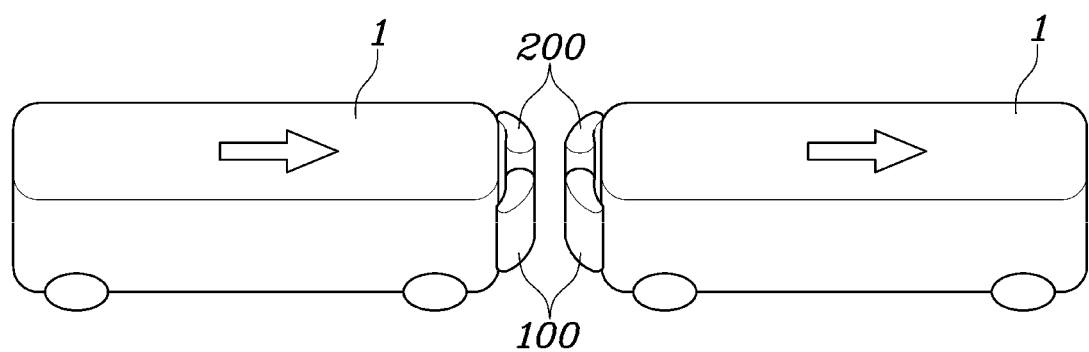
Figure 7:
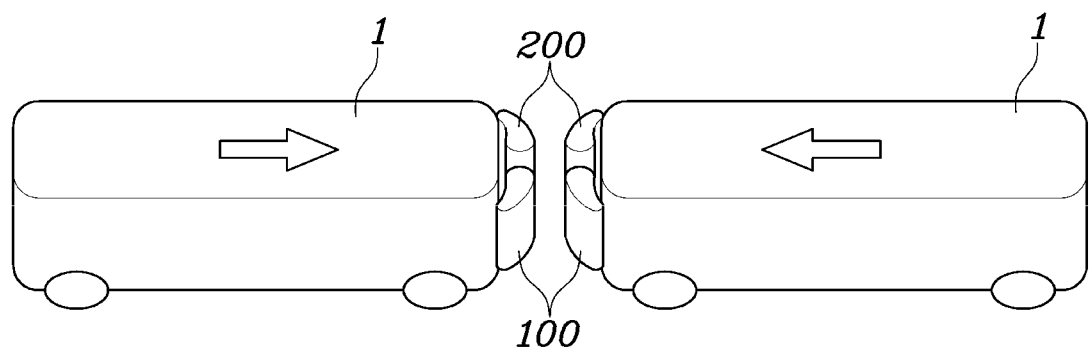

Further, as shown in FIG. 7, when a vehicle-to-vehicle frontal crash occurs between autonomous vehicles, all the left and right airbag apparatuses 100 and 200 are deployed to absorb the shock.

Figure 8:
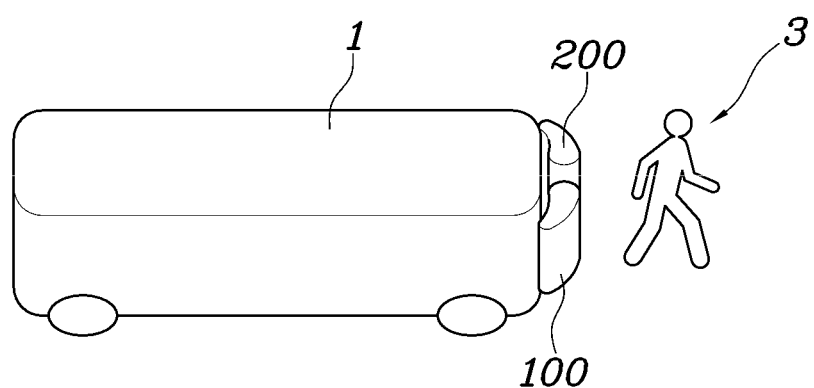
Figure 8:
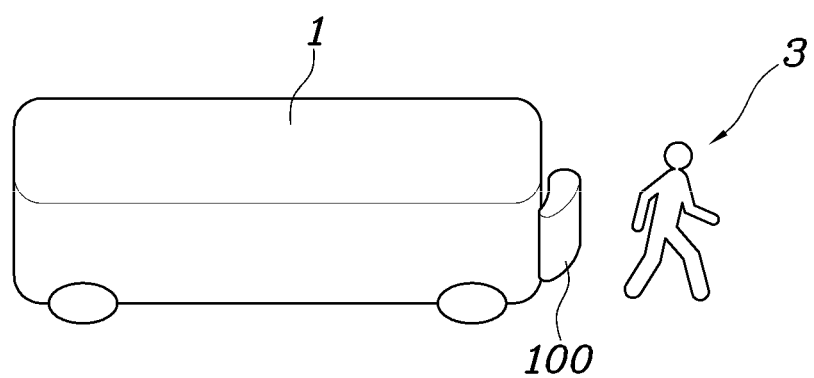

Further, as shown in FIG. 8, when a collision occurs between the autonomous vehicle and a pedestrian 3, depending on the position of the pedestrian 3 and recognition speed, either or both of the left and right airbag apparatuses 100 and 200 can be deployed simultaneously to protect the pedestrian.

While the present disclosure has been described in connection with what is presently considered to be practical exemplary forms, it is to be understood that the present disclosure is not limited to the disclosed forms, but, on the contrary, it is intended to cover various modifications and equivalent arrangements included within the spirt and scope of the present disclosure.

What is claimed is:

1. An airbag apparatus for a vehicle, the airbag apparatus comprising:
   an inflator provided at a pillar of a vehicle body, and configured to generate working gas;
   a housing mounted to the pillar of the vehicle body;
   a cushion part accommodated in the housing, the cushion part configured to be inflated and discharged from the housing by receiving the working gas generated from the inflator, and structured to cover the vehicle; and
   a tether part provided outside of the cushion part to determine a deployment shape of the cushion part,
   wherein the pillar includes an upper portion and a lower portion, and
   wherein the inflator and the housing are separately mounted to the upper portion and the lower portion, respectively.

2. The airbag apparatus of claim 1, wherein the lower portion of the pillar extends in a vertical direction, and
   wherein the housing is formed to extend in the vertical direction along the lower portion of the pillar.

3. The airbag apparatus of claim 1, wherein the pillar further includes a curved portion between the upper portion and the lower portion, and
   wherein the cushion part is folded along a shape of the curved portion of the pillar and is connected to the inflator.

4. The airbag apparatus of claim 1, wherein the housing includes an opening configured to discharge the cushion part, and
   wherein the opening is oriented to a center in a width direction of the vehicle body.

5. The airbag apparatus of claim 1, wherein the pillar is an A-pillar, and
   wherein the cushion part is configured to deploy and expand to cover a front of the vehicle.

6. The airbag apparatus of claim 1, wherein the cushion part is provided therein with a deployment guide device configured to guide the deployment shape of the cushion part by guiding a flow of the working gas provided from the inflator.

7. The airbag apparatus of claim 6, wherein the deployment guide device includes:
   a diffuser communicating with the inflator to branch and supply the working gas into the cushion part; and
   a first diaphragm and a second diaphragm dividing an internal space of the cushion part into multiple chambers,
   wherein the first diaphragm and the second diaphragm are provided with multiple flow holes to communicate adjacent chambers with each other.

8. The airbag apparatus of claim 7, wherein the diffuser branches the working gas in a vertical direction;
   the internal space of the cushion part is divided into the multiple chambers in the vertical direction by the first diaphragm and the second diaphragm, and the multiple chambers are configured such that volumes of internal spaces thereof are gradually decreased from lower to upper directions; and
   the working gas branching and being supplied from the diffuser is supplied in such a manner that a lowermost chamber of the multiple chambers is supplied with the working gas more than remaining chambers.

9. The airbag apparatus of claim 1, wherein the tether part includes a first tether and a second tether configured such that first ends thereof are fixed to the housing and second ends thereof are fixed to an end portion of the cushion part, and
   a length of the first tether is configured to be shorter than a length of the second tether.

10. The airbag apparatus of claim 9, wherein the first tether and the second tether are fixed to an end portion of a first surface of the cushion part, and
   wherein the first surface of the cushion part is configured to face a glass provided in the vehicle body.

11. The airbag apparatus of claim 9, further comprising a tether cutter for selectively cutting the first tether,
   wherein the cushion part is interrupted by the first tether or the second tether depending on operation of the tether cutter, which is selectively determined by a type of collision, and the deployment shape of the cushion part is determined.

12. The airbag apparatus of claim 1, wherein each of the inflator, the housing, the cushion part, and the tether part is configured as at least one pair that is arranged symmetrically with each other on opposite sides of a front edge or a rear edge of the vehicle body.

13. The airbag apparatus of claim 1, wherein the vehicle body is a vehicle body of an autonomous vehicle.

* * * * *